US012615354B2

(12) United States Patent
Uemura

(10) Patent No.: US 12,615,354 B2
(45) Date of Patent: Apr. 28, 2026

(54) IMAGE PROCESSING SYSTEM, IMAGE PROCESSING METHOD, AND STORAGE MEDIUM

(71) Applicant: CANON KABUSHIKI KAISHA, Tokyo (JP)

(72) Inventor: Shinichi Uemura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 113 days.

(21) Appl. No.: 18/603,028

(22) Filed: Mar. 12, 2024

(65) Prior Publication Data

US 2024/0314280 A1     Sep. 19, 2024

(30) Foreign Application Priority Data

Mar. 16, 2023     (JP) ................................. 2023-041650

(51) Int. Cl.
*H04N 13/117* (2018.01)
*G06T 7/00* (2017.01)

(52) U.S. Cl.
CPC ......... *H04N 13/117* (2018.05); *G06T 7/0002* (2013.01); *G06T 2207/20132* (2013.01); *G06T 2207/30168* (2013.01)

(58) Field of Classification Search
CPC .. H04N 13/117; H04N 13/111; H04N 13/122; G06T 7/0002; G06T 15/00; G06T 15/005; G06T 15/04; G06T 15/205; G06T 15/30; G06T 2207/20132; G06T 2207/30168
See application file for complete search history.

(56) References Cited

U.S. PATENT DOCUMENTS

| 11,323,689 B2 * | 5/2022 | Okuzawa | ................... | G06T 1/00 |
|---|---|---|---|---|
| 11,902,577 B2 * | 2/2024 | Sugio | ................... | G01B 11/245 |
| 11,972,550 B2 * | 4/2024 | Horita | ................... | G01N 21/95 |
| 12,010,437 B2 * | 6/2024 | Aizawa | ................ | H04N 13/282 |
| 2022/0060638 A1 * | 2/2022 | Aizawa | ................... | H04N 5/265 |
| 2023/0351674 A1 * | 11/2023 | Ohba | ...................... | G06T 15/06 |
| 2024/0135622 A1 * | 4/2024 | Uemura | .............. | G06V 10/761 |

FOREIGN PATENT DOCUMENTS

JP          2015045920 A       3/2015

* cited by examiner

*Primary Examiner* — Vijay Shankar
(74) *Attorney, Agent, or Firm* — Canon U.S.A., Inc. IP Division

(57) ABSTRACT

An image processing system includes one or more memories storing instructions, and one or more processors executing the instructions to acquire a plurality of virtual viewpoint images generated based on a plurality of captured images obtained by a plurality of image capturing apparatuses performing image capture, determine a specific virtual viewpoint image of the plurality of virtual viewpoint images based on a first user operation, and display image quality information indicating an image quality of a partial region specified based on a second user operation, the partial region being in the specific virtual viewpoint image.

4 Claims, 12 Drawing Sheets

FIG.10

IMAGE PROCESSING SYSTEM, IMAGE PROCESSING METHOD, AND STORAGE MEDIUM

BACKGROUND

Field of the Disclosure

The present disclosure relates to an image processing system, an image processing method, a storage medium, and the like.

Description of the Related Art

There is a high-profile technique for generating a virtual viewpoint image from a designated virtual viewpoint using a plurality of images obtained by a plurality of image capturing apparatuses performing image capture. Japanese Patent Application Laid-Open No. 2015-045920 discusses a method of capturing images of a subject by a plurality of image capturing apparatuses installed at different positions and then generating a virtual viewpoint image using a three-dimensional (3D) model for the subject estimated from the captured images obtained through the image capture.

On the other hand, displaying a thumbnail image is known as a method of plainly expressing a video generated with a plurality of frames in distribution of the video. A thumbnail image is an image whose file size is reduced so that the content of the video can be determined at a glance, and is desired to be used in distribution of a virtual viewpoint video generated with a plurality of virtual viewpoint images.

SUMMARY

According to an aspect of the present disclosure, an image processing system includes one or more memories storing instructions, and one or more processors executing the instructions to acquire a plurality of virtual viewpoint images generated based on a plurality of captured images obtained by a plurality of image capturing apparatuses performing image capture, determine a specific virtual viewpoint image of the plurality of virtual viewpoint images based on a first user operation, and display image quality information indicating an image quality of a partial region specified based on a second user operation, the partial region being in the specific virtual viewpoint image.

Further features of the present disclosure will become apparent from the following description of exemplary embodiments with reference to the attached drawings.

BRIEF DESCRIPTION OF THE DRAWINGS

FIG. 10 illustrates a configuration example of the content generation unit according to one or more aspects of the present disclosure.

DESCRIPTION OF THE EMBODIMENTS

Figure 1:
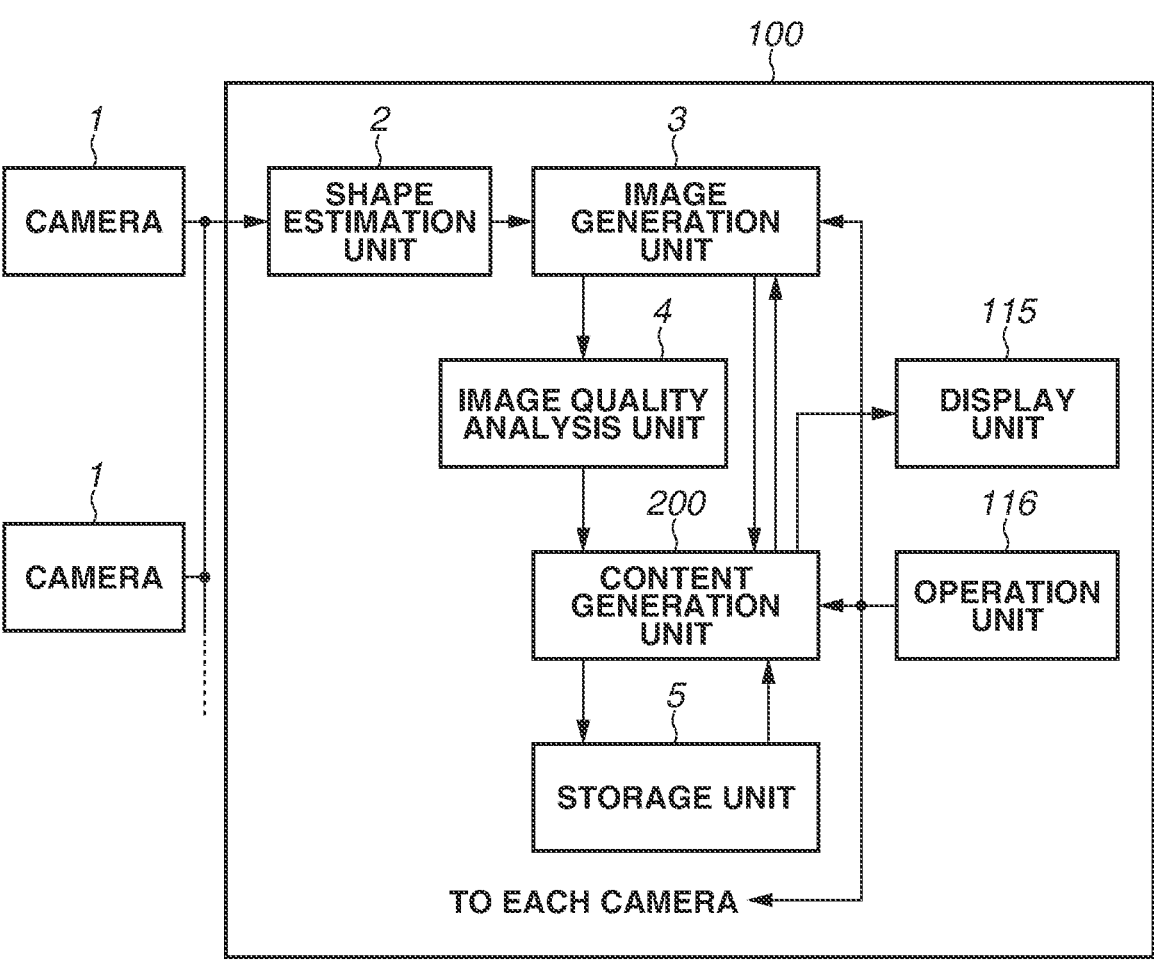
FIG. 1 illustrates an example of a unit configuration of an image processing system according to one or more aspects of the present disclosure.

Hereinafter, exemplary embodiments of the present disclosure will be described with reference to the drawings. However, the present disclosure is not limited to the following exemplary embodiments. In the drawings, like numbers refer to like components or elements, and redundant description thereof will be omitted or simplified.

Overview of Virtual Viewpoint Image Generation Function in Image Processing System An image processing system 100 according to a first exemplary embodiment generates a virtual viewpoint image viewed from a virtual viewpoint based on captured images obtained by a plurality of image capturing apparatuses (cameras) performing image capture in different directions, on states of the image capturing apparatuses, and on the designated virtual viewpoint. Then, the virtual viewpoint image is displayed on a surface of a virtual three-dimensional image. The image capturing apparatuses each may include a functional unit that performs image processing, in addition to a camera. The image capturing apparatuses each may include a sensor for acquiring distance information, in addition to a camera.

The plurality of cameras performs image capture of an image capturing region in a plurality of directions. An image capturing region is, for example, a region defined by the field of a stadium and a certain height. An image capturing region may correspond to a three-dimensional space for estimating a three-dimensional (3D) model for a subject. A three-dimensional space may be the whole or a part of an image capturing region. An image capturing region may be, for example, a concert hall or an image capturing studio.

The plurality of cameras is installed at different positions and in different directions (orientations) so as to surround an image capturing region, and perform image capture in synchronization with each other. The plurality of cameras may not be installed along the entire circumference of an image capturing region, and may be installed in a part of the directions of the image capturing region depending on the restriction of the installation places or other restrictions. The number of cameras is not limited. For example, for a rugby stadium as an image capturing region, about several tens to several hundreds of cameras may be installed around the stadium.

The plurality of cameras may include cameras with different angles of view, such as a telephoto camera and a wide-angle camera. For example, the image capture of players with high resolutions using a telephoto camera provides an improved resolution of a virtual viewpoint image to be generated. For ball games, because of a wide range of movement of a ball, using a wide-angle camera for image capture leads to a reduction of the number of cameras. Further, a combination of image capturing regions of a telephoto camera and a wide-angle camera for image capture provides an improved freedom of the installation positions. The cameras are synchronized at a common image capturing time, and image captured time information is added to the captured image for each frame.

A virtual viewpoint image is also referred to as a free viewpoint image, which can be viewed as an image corresponding to a viewpoint freely (arbitrarily) designated by a user. Examples of a virtual viewpoint image include an image viewed as an image corresponding to a viewpoint selected by a user from among a plurality of limited viewpoint candidates. A virtual viewpoint may be designated by a user operation or by artificial intelligence (AI) based on the result of image analysis. A virtual viewpoint image may be a moving image or a still image.

Virtual viewpoint information used for generating a virtual viewpoint image includes, for example, the position and the direction (orientation), and further the angle of view (focal length) of a virtual viewpoint. Specifically, virtual viewpoint information includes a parameter representing the three-dimensional position of a virtual viewpoint, a parameter representing the orientation (line of sight direction) from the virtual viewpoint in pan, tilt, and roll directions, and focal length information. However, the content of virtual viewpoint information is not limited to the above.

Virtual viewpoint information may include a parameter by a plurality of frames. In other words, virtual viewpoint information may include parameters each corresponding to a plurality of frames constituting a moving image of a virtual viewpoint image and indicate the position and direction of the virtual viewpoint at a plurality of consecutive time points.

A virtual viewpoint image is generated by, for example, the following method. First, images of a subject are captured in different directions by a plurality of cameras, and thus the images captured by the plurality of cameras are acquired. Next, a foreground image obtained by extracting a foreground region corresponding to the subject, such as a person or a ball, and a background image obtained by extracting a background region other than the foreground region are acquired from the plurality of camera images. The foreground image and the background image have texture information (e.g., color information).

A foreground model representing a 3D model for the subject and texture data for coloring the foreground model are then generated based on the foreground image. Texture data for coloring a background model representing a 3D model for the background, such as a stadium, is generated based on the background image. Then, the pieces of texture data are mapped to the foreground model and the background model, respectively, and rendering is performed according to a virtual viewpoint indicated by the virtual viewpoint information, generating a virtual viewpoint image.

However, the method of generating a virtual viewpoint image is not limited thereto, and various methods, such as a method of generating a virtual viewpoint image by projective transformation of captured images without using foreground and background models, can be used.

A foreground image is an image obtained by extracting a region of a subject (foreground region) from a captured image captured and acquired by a camera. A subject extracted as a foreground region refers to, for example, a dynamic subject (moving subject) that moves (whose position or shape can change) among images captured in time series in a direction. Examples of the subject include a person, such as a player or a referee in the field where a competition is held, and if it is a ball game, a ball in addition to a person. In concerts or entertainments, singers, players, performers, emcees, and the like are foreground subjects.

A background image is an image of a region (background region) different from at least the region of a subject for a foreground image. Specifically, a background image is an image excluding a subject for a foreground image from a captured image. A background refers to an image capturing target object that stays still or nearly still among images captured in a direction in time series.

Examples of such an imaging target object includes a stage of a concert and a stadium where an event, such as a competition, is held, and a structure, such as a goal used in a ball game, and a field. However, a background region is at least a region different from the region of a subject as a foreground region. An image capturing target may include another object, in addition to a subject and the background. Description of Unit Configuration of Image Processing System FIG. 1 illustrates the image processing system 100 according to the present exemplary embodiment. Further, some of the functional blocks illustrated in FIG. 1 are realized by causing a computer included in the image processing system 100 to execute computer programs stored in a memory as a storage medium. However, a part or all of the functional blocks may be realized with hardware. Examples of the hardware to be used include a dedicated circuit (application-specific integrated circuit (ASIC)) and a processor (digital signal processor (DSP) as a reconfigurable processor).

The functional blocks of the image processing system 100 may not be incorporated in a housing, and may be realized with separate devices connected to each other via a signal path. The image processing system 100 is connected to a plurality of cameras 1. The image processing system 100 includes a shape estimation unit 2, an image generation unit 3, an image quality analysis unit 4, a content generation unit 200, a storage unit 5, a display unit 115, and an operation unit 116.

The shape estimation unit 2 is connected to the plurality of cameras 1 and the image generation unit 3, and the display unit 115 is connected to the content generation unit 200. Further, the respective functional blocks may be implemented with separate devices, or all or some of the functional blocks may be implemented with the same device.

The plurality of cameras 1 is disposed at different positions around, for example, a stage of a concert, a stadium where an event, such as a competition, is held, a structure, such as a goal used in a ball game, or a field, and each performs image capture from different viewpoints. Each of the plurality of cameras 1 has an identification number (camera number) for identifying the camera. The plurality of cameras 1 each may also have another function or include a piece of hardware (e.g., a circuit or a device) that realizes a function of extracting a foreground image from a captured image. A camera number may be set based on the installation position of the corresponding camera of the plurality of cameras 1 or may be set based on another criterion.

The image processing system 100 may be disposed in a venue where the plurality of cameras 1 is arranged, or outside the venue, for example, in a broadcasting station. The image processing system 100 is connected to the plurality of cameras 1 via a network.

The shape estimation unit 2 acquires a plurality of captured images from the plurality of cameras 1. Then, the shape estimation unit 2 estimates a 3D model for a subject based on the plurality of captured images acquired from the plurality of cameras 1. Specifically, the shape estimation unit 2 generates 3D model data represented by a known representation method. The 3D model data may be point group data composed of points, mesh data composed of polygons, or voxel data composed of voxels.

The image generation unit 3 can acquire information indicating the position and the orientation of the 3D model for the subject from the shape estimation unit 2, and generate a virtual viewpoint image including a two-dimensional shape of the subject expressed when the 3D model for the subject is viewed from the virtual viewpoint. In addition, in order to generate a virtual viewpoint image, the image generation unit 3 can also receive the designation of virtual viewpoint information (e.g., the position of the virtual viewpoint and the direction of the line of sight from the virtual viewpoint) from a user and generate the virtual viewpoint image based on the virtual viewpoint information. The image generation unit 3 functions as an acquisition unit that generates a virtual viewpoint image based on a plurality of images obtained from the plurality of cameras 1.

The image quality analysis unit 4 acquires various kinds of information used in generating a virtual viewpoint image from the image generation unit 3 and evaluates the image quality of the virtual viewpoint image. Specifically, image quality information is generated that quantitatively indicates the virtual viewpoint image, and that indicates the evaluation of the shape of a 3D model used in evaluation of a textured image and generation of the virtual viewpoint image. For example, the image quality information is defined by an angle θ formed by the line-of-sight direction of a virtual viewpoint with respect to a gaze point when a texture is rendered on the 3D model and the line-of-sight direction of the corresponding camera of the plurality of cameras 1 at a position closest to the virtual viewpoint. The image quality information is generated using the angle θ. A generation method is shown in Formula (1). Image quality information Ia is a real number of which the maximum is 1.0, and indicates that the smaller the angle θ is, the higher the texture evaluation is. This is calculated for each rendered pixel.

$$Ia = (1 - \theta/180) \qquad \text{Formula (1)}$$

The image quality information is generated separately into information for a subject determined to be a main person (hereinafter, referred to as a main subject) by a content creator and information other than the main subject, and two frames, that is, a frame including image quality information on only the main subject and a frame including image quality information on all the subjects are stored in the storage unit 5.

This is because there is a case where the image quality information on only the main subject is used in processing described below.

For this purpose, for example, the display unit 115 displays a graphical user interface (GUI) for designating a main subject to a content creator, and the image generation unit 3 performs processing of identifying the main subject and the other subjects from 3D models for the plurality of subjects.

Further, the method of generating the image quality information is not limited to the above-described method, and any other method may be used as long as the image quality information is quantified using various kinds of information in generating a virtual viewpoint image. For example, the information at the time of the acquisition may be the number of cameras of which the image capturing range includes a gaze point with respect to a 3D model. As the number of cameras increases, the image of the foreground model after rendering tends to be closer to the captured image of the subject, and thus the number of cameras may be used as the image quality information. In this case, the image quality information is information indicating the shape accuracy of a 3D model for a subject. Further, a plurality of kinds of image quality subjected to a product-sum operation may be used as one kind of image quality information.

The image quality information and the virtual viewpoint image described above are transmitted to the content generation unit 200, and the content generation unit 200 generates, for example, a three-dimensional digital content as described below. Further, the digital content including the virtual viewpoint image generated by the content generation unit 200 is output to the display unit 115.

Further, the content generation unit 200 can also directly receive images from the plurality of cameras 1 and supply the image of each of the plurality of cameras 1 to the display unit 115. Further, the content generation unit 200 can switch which surface of the three-dimensional digital content is used to display the image of each of the plurality of cameras 1 and the virtual viewpoint image based on an instruction from the operation unit 116.

The display unit 115 includes, for example, a liquid-crystal display or a light-emitting diode (LED), and acquires and then displays the digital content including the virtual viewpoint image from the content generation unit 200. The display unit 115 also displays, for example, a GUI for a user to operate each of the plurality of cameras 1.

The operation unit 116 includes a joystick, a jog dial, a touch panel, a keyboard, and a mouse, and is used by a user to operate the plurality of cameras 1 and other components.

The operation unit 116 is used by a user to select an image to be displayed on a surface of the digital content (three-dimensional image) generated by the content generation unit 200. Further, the operation unit 116 can designate the position and the orientation of the virtual viewpoint for generating the virtual viewpoint at the image generation unit 3.

The storage unit 5 includes a memory for storing the digital content generated by the content generation unit 200, the virtual viewpoint image, the image quality information, camera images, and other data. The storage unit 5 may include a detachable recording medium. The detachable recording medium may record, for example, a plurality of camera images captured at other venues or sports scenes, virtual viewpoint images generated using the camera images, and digital contents generated by combining them.

The storage unit 5 may store, for example, a plurality of camera images downloaded from an external server or another source via a network, virtual viewpoint images generated using the camera images, and digital contents generated by combining them. These camera images, the virtual viewpoint images, the digital contents, and the like may be created by a third party.

Description of Hardware Configuration of Image Processing System

Figure 2:
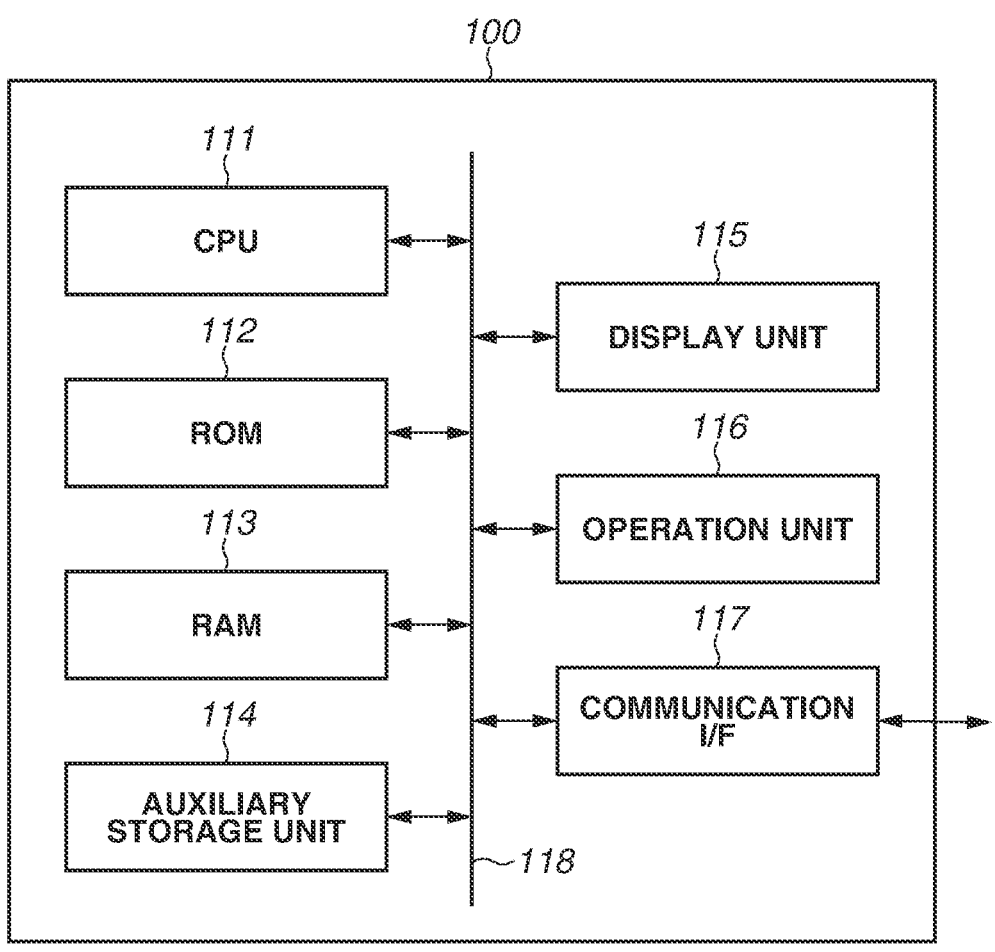
FIG. 2 illustrates a hardware configuration of the image processing system according to one or more aspects of the present disclosure.

FIG. 2 illustrates a hardware configuration of the image processing system 100 according to the first exemplary embodiment, and the hardware configuration of the image processing system 100 will be described with reference to FIG. 2.

The image processing system 100 includes a central processing unit (CPU) 111, a read-only memory (ROM) 112, a random-access memory (RAM) 113, an auxiliary storage unit 114, the display unit 115, the operation unit 116, a communication interface (I/F) 117, and a bus 118. The CPU 111 generally controls the image processing system 100 using computer programs or the like stored in the ROM 112, the RAM 113, the auxiliary storage unit 114, or another memory, realizing each functional block of the image processing system 100 illustrated in FIG. 1.

The RAM 113 temporarily stores, for example, computer programs and data supplied from the auxiliary storage unit 114, and data supplied from the outside via the communication I/F 117. The auxiliary storage unit 114 includes, for example, a hard disk drive, and stores various types of data, such as digital contents including image data, audio data, and virtual viewpoint images from the content generation unit 200.

As described above, the display unit 115 displays digital contents including virtual viewpoint images, GUIs, and the like. As described above, the operation unit 116 receives operation inputs by a user and inputs various instructions to the CPU 111. The CPU 111 operates as a display control unit that controls the display unit 115 and as an operation control unit that controls the operation unit 116.

The communication I/F 117 is used in communication with external devices (for example, the plurality of cameras 1 and an external server) outside the image processing system 100. For example, with the image processing system 100 connected to an external device in a wired connection, a communication cable is connected to the communication I/F 117. With the image processing system 100 capable of wirelessly communicating with external devices, the communication I/F 117 includes an antenna. The bus 118 connects the respective units of the image processing system 100 to each other to transmit information.

In the present exemplary embodiment, an example is described in which the display unit 115 and the operation unit 116 are included inside the image processing system 100, but at least one of the display unit 115 and the operation unit 116 may exist as a separate unit outside the image processing system 100. The image processing system 100 may be in the form of, for example, a personal computer (PC) terminal.

Description of Configuration of Content Generation Unit 200

Figure 3:
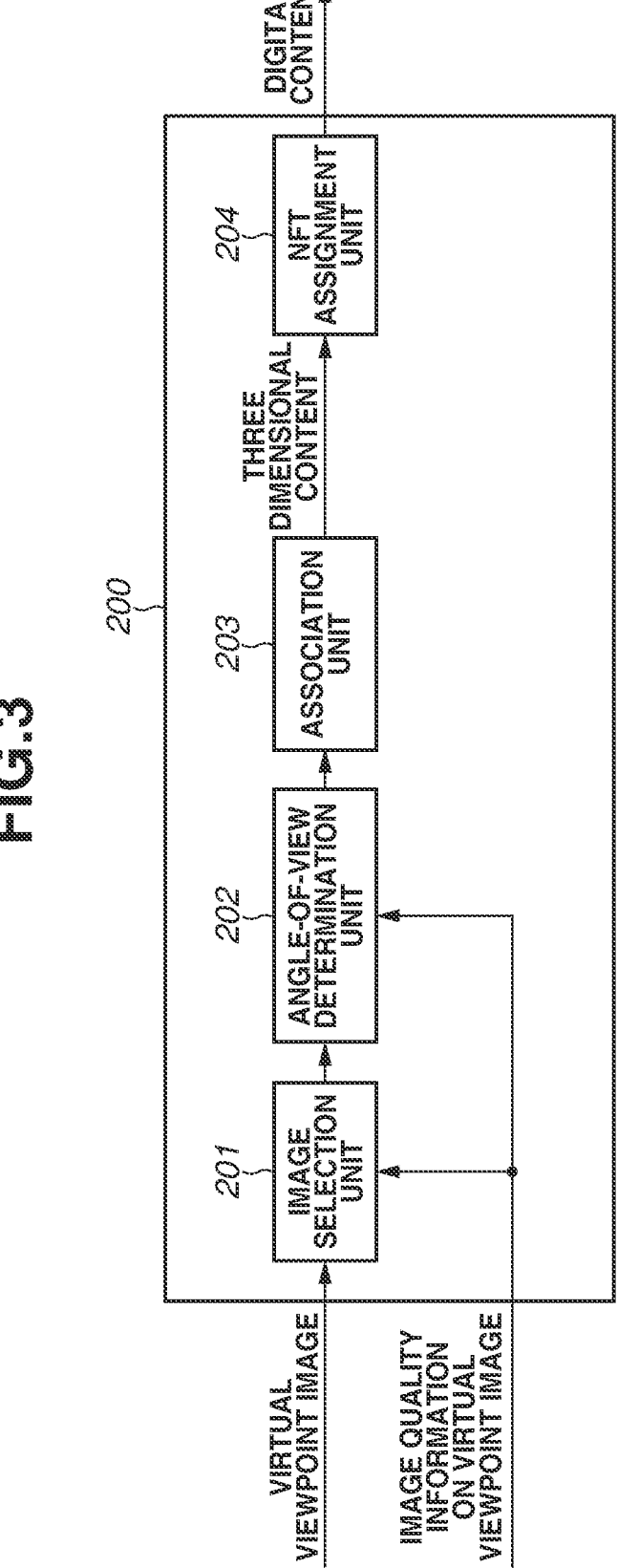
FIG. 3 illustrates a configuration example of a content generation unit according to one or more aspects of the present disclosure.

A configuration of the content generation unit 200 according to the first exemplary embodiment will be described with reference to FIG. 3. The content generation unit 200 includes an image selection unit 201, an angle-of-view determination unit 202, an association unit 203, and a non-fungible token (NFT) assignment unit 204.

An overview of each unit will now be described. Details will be described below using a flowchart of FIG. 7.

The image selection unit 201 selects (specifies) a virtual viewpoint image to be included in a digital content from among virtual viewpoint images of a plurality of frames based on image quality information corresponding to the images.

The angle-of-view determination unit 202 cuts out an image to be associated with a display surface included in the three-dimensional digital content at the angle of view equal to the aspect ratio of the display surface from the image selected by the image selection unit 201. The position and the size of the angle of view are determined based on the image quality information.

The association unit 203 generates a digital content in a three-dimensional shape and associates the image cut out by the angle-of-view determination unit 202 with a display surface of the three-dimensional digital content. In associating the image with the display surface, the association unit 203 performs resolution conversion on the cut-out image so that the resolution of the cut-out image matches the resolution of the display surface.

The NFT assignment unit 204 assigns an NFT to the digital content generated by the association unit 203.

In distributing a virtual viewpoint video, it is conceivable to distribute not only a two-dimensional video for which a virtual viewpoint is set in advance, but also a 3D model, so that the virtual viewpoint video can be viewed based on a virtual viewpoint set by a user. Thus, the digital content according to the present exemplary embodiment includes a two-dimensional video generated with a virtual viewpoint and an image capturing time set in advance, or a 3D model for a subject that changes over time.

Figure 5:
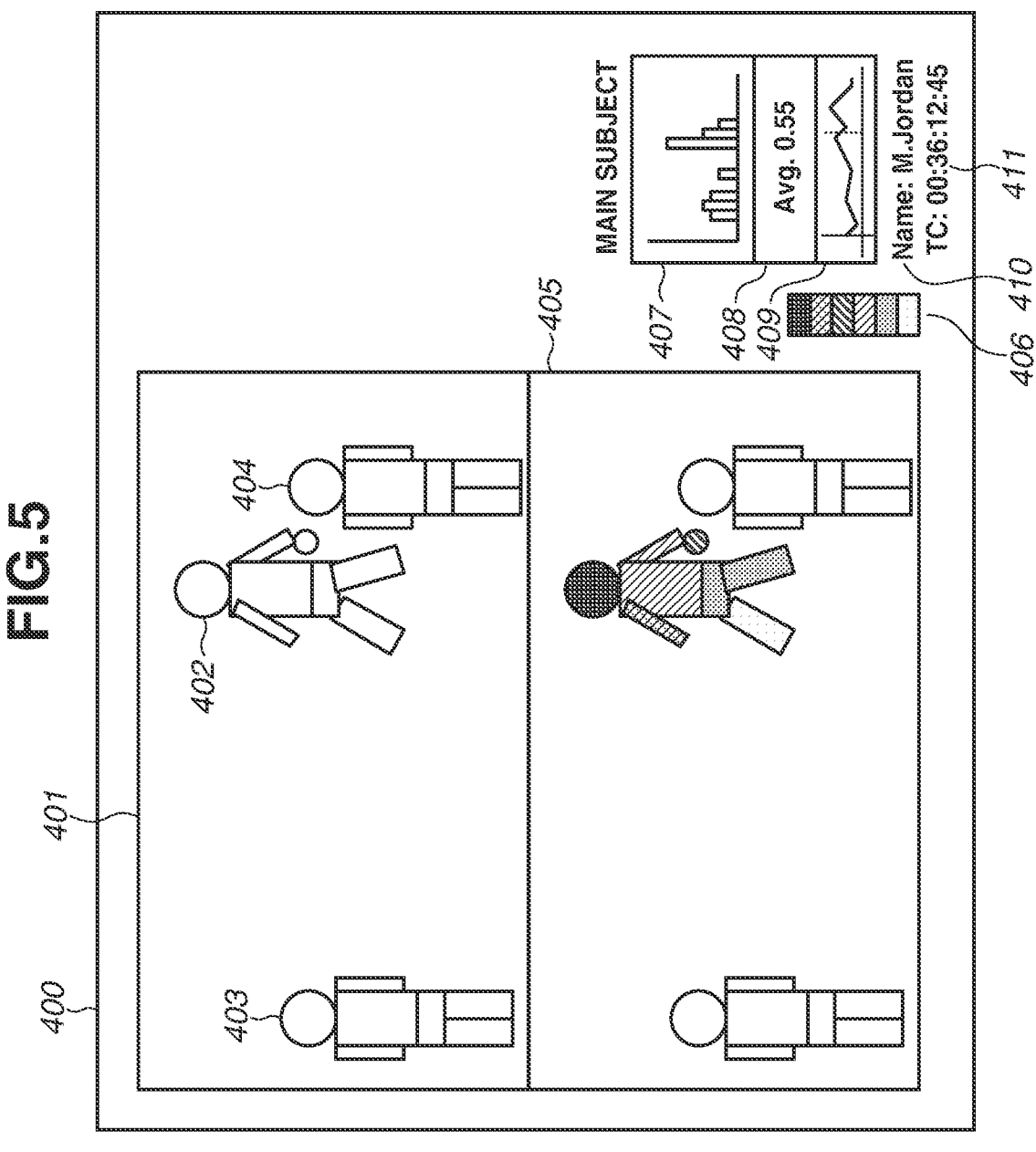
FIG. 5 illustrates a graphical user interface (GUI) example for making image settings according to one or more aspects of the present disclosure.
Figure 6:
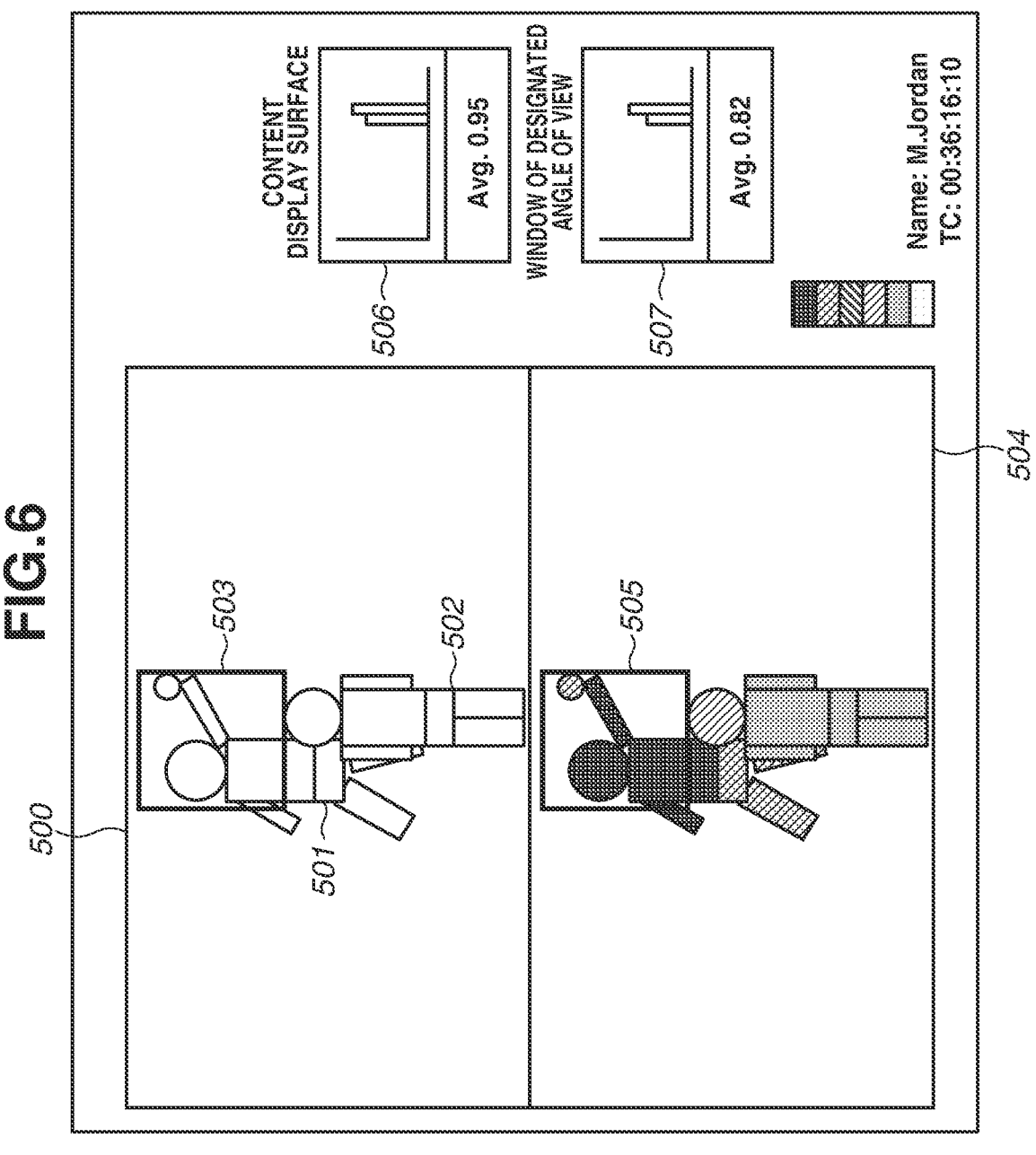
FIG. 6 illustrates an example of a GUI for determining an angle of view according to one or more aspects of the present disclosure.
Figure 7:
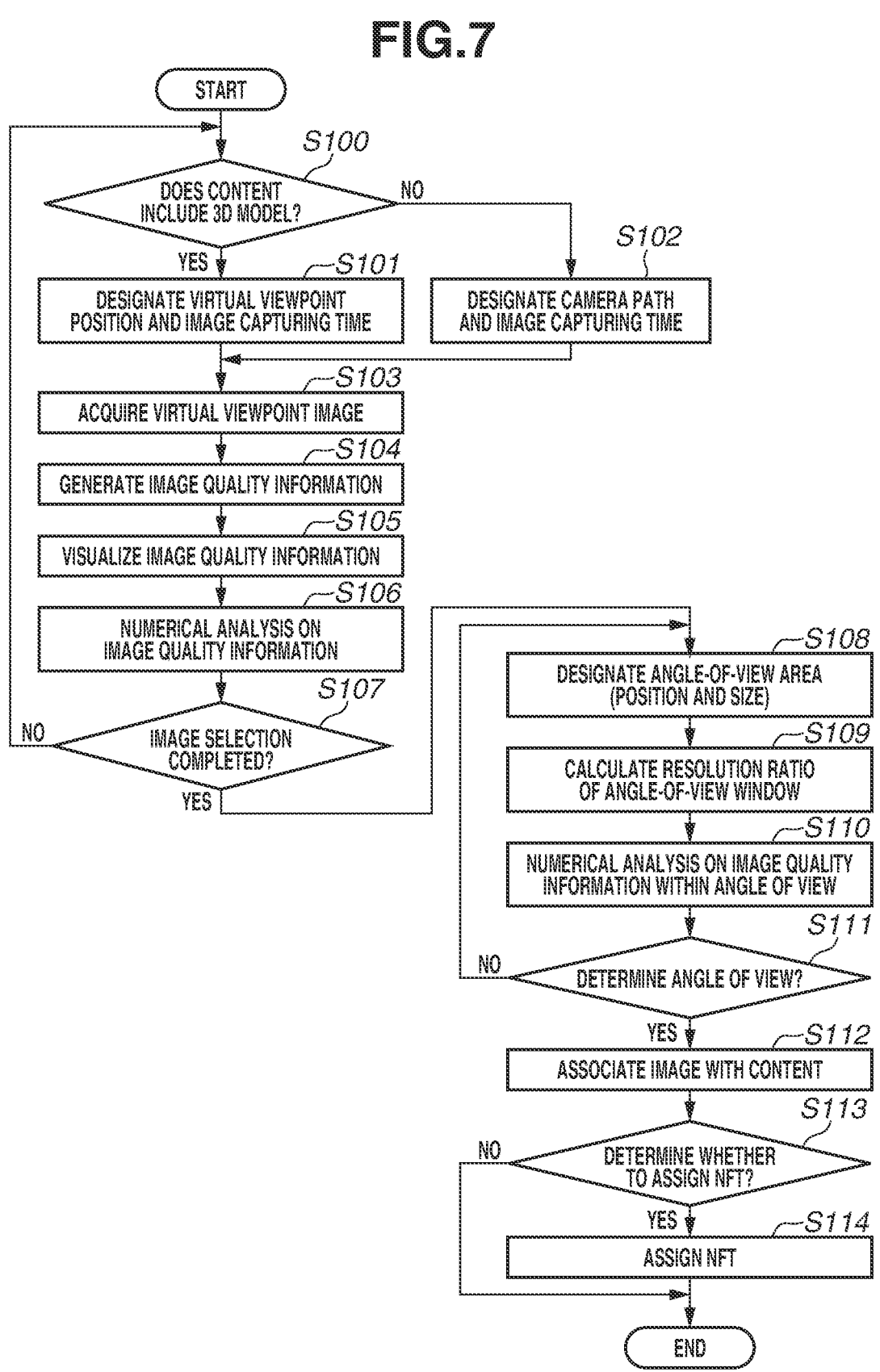
FIG. 7 is a flowchart illustrating an operation procedure for the image processing system according to one or more aspects of the present disclosure.

Method of Selecting Virtual Viewpoint Image Based on Image Quality Information and Determining Angle of View by Using GUI A method of selecting a virtual viewpoint image based on image quality information and determining an angle of view to be associated with a content display surface using a GUI will be described with reference to FIGS. 1 to 7. FIG. 7 is the flowchart illustrating an operation procedure for the image processing system 100 and the content generation unit 200 according to the first exemplary embodiment. The CPU 111 as a computer of the image processing system 100 executes computer programs stored in memory, such as the ROM 112 and/or the auxiliary storage unit 114, whereby processing of each step of the flowchart of FIG. 7 is performed. The present exemplary embodiment will be described in detail along this flowchart.

The image processing system 100 starts processing in response to when the operation unit 116 receives an operation to start content creation from a user.

In step S100, if the present digital content includes a 3D model for a subject (YES in step S100), the processing proceeds to step S101, and if a two-dimensional video with one or more camera paths is included (NO in step S100), the processing proceeds to step S102. According to the present exemplary embodiment, the digital content includes either a 3D model or a two-dimensional video.

In step S101, the CPU 111 instructs the image generation unit 3 to generate a virtual viewpoint image of one frame by designating an image capturing time and the position of a virtual viewpoint. For the CPU 111 to perform the designation and instruction, for example, a GUI for inquiring of the user (digital content creator) about the image capturing time and the position of the virtual viewpoint is displayed on the display unit 115.

In step S102, the CPU 111 instructs the image generation unit 3 to generate a virtual viewpoint image of one frame by designating the image capturing time and, if there are a plurality of camera paths, a desired camera path. For the CPU 111 to perform the designation and instruction, for example, a GUI for inquiring of the user about the selection of the image capturing time and the camera path is displayed on the display unit 115.

In step S103, the image selection unit 201 acquires the virtual viewpoint image designated in step S101 or S102 from the image generation unit 3.

In step S104, the image quality analysis unit 4 acquires information at the time of generation of the virtual viewpoint image from the image generation unit 3, and generates image quality information on the virtual viewpoint image. Then, the image selection unit 201 acquires the image quality information.

In step S105, the CPU 111 converts the image quality information for each pixel stored in the storage unit 5 into a heat map and displays the heat map as a GUI on the display unit 115. FIG. 5 illustrates an example of a GUI for selecting an image based on image quality information. FIG. 5 illustrates a screen 400 of the display unit 115, a designated virtual viewpoint image 401, a heat map 405 from the image quality information, and a legend 406 of the heat map. FIG. 5 also illustrates a main subject 402, and subjects 403 and 404 other than the main subject. In the present exemplary embodiment, a value of the heat map 405 is displayed only for the main subject 402. This is to clearly show the target of numerical analysis to be described in the next step to the user (content creator) in an easy-to-understand manner. If it is not necessary to clearly show the target, the target of the heat map may be all the subjects.

In step S106, the image selection unit 201 performs numerical analysis on the image quality information on the main subject. In the present exemplary embodiment, as an example of numerical analysis, the histogram generation of values of the image quality information and the calculation of an average value of the image quality information are performed only for the main subject. The reason why the numerical analysis is limited to the main subject is that the image quality information is different among the subjects. For example, if the numerical analysis target is all the subjects in the frame, unnecessary information is included for the numerical analysis, which prevents correct analysis results that focus on the main subject from being obtained. The CPU 111 displays these analysis results on the display unit 115 with a GUI. FIG. 5 illustrates GUI display examples 407 to 411. These GUI display examples are a histogram 407, an average value 408, a time-series average value 409, the name 410 of a main subject 402, and a time code 411 of the virtual viewpoint image.

In step S107, the image selection unit 201 selects a virtual viewpoint image with a high image quality. Specifically, with a sufficient image quality of the virtual viewpoint image acquired in step S103, the virtual viewpoint image acquired in step S103 is selected as the virtual viewpoint image with the high image quality. If the selection is completed (YES in step S107), the processing proceeds to step S108, and if the selection is not completed (YES in step S107), the processing returns to step S100. This selection is performed by the user checking the information shown with the GUI visualized through the numerical analysis of the image quality information and the virtual viewpoint image corresponding to the image quality information. The image selection unit 201 performs error determination at the time of selection. If a numerical analysis result is lower than a predetermined threshold set in advance for numerical analysis results, which means that it is determined that there is a problem in image quality, the error determination is notified to the GUI. Steps S100 to S107 are repeated, and the user selects an image with a high image quality near or at a favorite scene from among the frames of a virtual viewpoint video formed over continuous image capturing times. For this purpose, for example, a GUI for inquiring of the user whether to select a currently displayed virtual viewpoint image is displayed on the display unit 115.

In step S108, the CPU 111 designates, to the angle-of-view determination unit 202, the position and the size of an angle of view equal to the aspect ratio of a display surface included in the three-dimensional digital content, in the image selected by the image selection unit 201. For this purpose, for example, a GUI for inquiring of the user about the position and the size of the angle of view is displayed on the display unit 115. FIG. 6 illustrates an example of a GUI for determining the angle of view based on the image quality information. FIG. 6 illustrates a virtual viewpoint image 500, a window 503 indicating an angle of view designated by the user (hereinafter, referred to as an angle-of-view window), a heat map 504 of image quality information corresponding to the virtual viewpoint image, and an angle-of-view window 505 displayed at the same position and size interlocked with the angle of view window 503. FIG. 6 also illustrates a main subject 501 and a subject 502 other than the main subject 501.

In step S109, the angle-of-view determination unit 202 calculates the ratio between the resolutions of the angle-of-view window 503 and the display surface of the three-dimensional digital content.

In step S110, the angle-of-view determination unit 202 performs numerical analysis on image quality information within the angle of view. In the present exemplary embodiment, as an example of numerical analysis, the histogram generation of values of the image quality information and the calculation of an average value of the image quality information are performed only for all subjects within the angle of view. Next, the image quality information is corrected using the ratio of the resolutions calculated in step S109. This correction is performed to calculate image quality information after the image within the angle of view is associated with the content display surface. For example, if the resolution of the selected angle of view is higher than the resolution of the content display surface, the image of the selected angle of view is subjected to enlargement processing so that the resolution of the image matches the resolution of the content display surface. In displaying a rendered texture deformed in the enlargement direction, this deformation acts in the direction in which the roughness of the image quality is conspicuous to the human eye. Thus, the image quality information is corrected downward according to the resolution ratio. Conversely, if the resolution of the selected angle of view is lower than the resolution of the content display surface, the resolution is corrected upward according to the resolution ratio. A formula for correcting the image quality information according to the resolution ratio is shown in Formula (2). Ib is image quality information after correction, Ia is image quality information before correction, Rw is the resolution of a selected angle of view, Rc is the resolution of a content display surface, and $\alpha$ is a constant for determining the degree of correction. $\alpha$ is a real number set by a user so that the correction amount is appropriate.

$$Ib = Ia \times Rw/Rc \times \alpha \qquad \text{Formula (2)}$$

The CPU 111 displays these analysis results on the display unit 115 with a GUI. FIG. 6 also illustrates a histogram and an average value 506 of the image quality information for all the subjects as the target within the angle of view, and a histogram and an average value 507 obtained by recalculating the histogram and the average value 506 as image quality information in accordance with the resolution ratio. In the present exemplary embodiment, the change in image quality due to the difference in resolution is displayed with the GUI by correcting the image quality information using the resolution ratio, but the present disclosure is not limited to this method. For example, both the image selected in the angle-of-view window 503 and the image of the display surface of the three-dimensional digital content may be displayed with the GUI at actual resolutions, or a resolution ratio may be displayed.

In step S111, the angle-of-view determination unit 202 determines the position and the size of the angle of view to be associated with the display surface of the three-dimensional digital content. If the determination is completed (YES in step S111), the processing proceeds to step S112. If the determination is not completed (NO in step S111), the processing returns to step S108. This determination is performed by the user checking the information shown with the GUI visualized through the numerical analysis of the image quality information and the virtual viewpoint image corresponding to the image quality information. The angle-of-view determination unit 202 performs error determination at the time of selection, and if a numerical analysis result is lower than a predetermined thresholds set in advance for numerical analysis results, which means that it is determined that there is a problem in image quality, the error determination is notified to the GUI. By repeating steps S108 to S111, the user determines the angle of view that does not include an image with an image quality that is not suitable for the content display surface. For this purpose, for example, a GUI for inquiring of the user whether to determine the angle of view currently displayed is displayed on the display unit 115.

Figure 4:
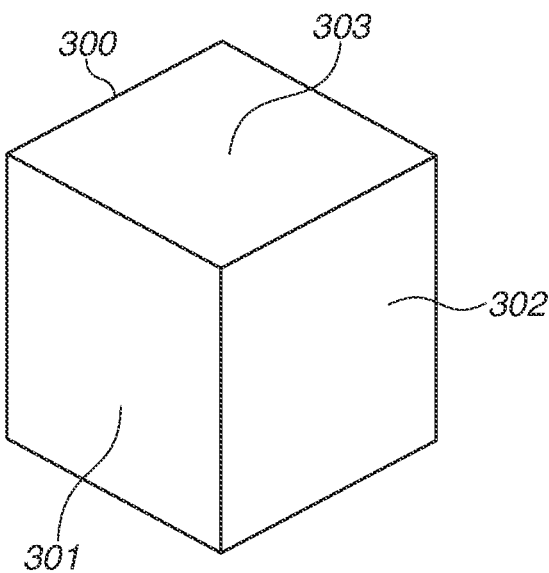
FIG. 4 illustrates a three-dimensional image as a digital content generated by the content generation unit according to one or more aspects of the present disclosure and by content generation units according to one or more aspects of the present disclosure.

In step S112, the association unit 203 performs resolution conversion on the image of the angle of view determined in step S111 so that the resolution of the image matches the resolution of the display surface of the three-dimensional digital content, and associates the image with the display surface of the digital content. FIG. 4 illustrates an example of the digital content in a three-dimensional shape generated by the content generation unit 200. In accordance with the control of the CPU 111, the association unit 203 associates various images and information with the respective corresponding surfaces (the surface seen on the left side is a first surface 301, the surface seen on the right side is a second surface 302, and the surface seen on the upper side is a third surface 303) of the digital content in a three-dimensional shape 300 in FIG. 4. First, a main camera image is associated with the first surface 301. A main camera image is an image selected for TV broadcasting or the like from among a plurality of images obtained from a plurality of cameras installed in a sports venue.

A main camera image is an image including a main subject in an angle of view. Next, data, such as the name of a player who shot a goal, the team's name to which the player belongs, and the final match result of the match that the player shot a goal, is associated with the third surface 303 as the accompanying data. If an NFT is assigned, data representing rarity, such as the number of issues of NFTs, may be displayed on the third surface 303 as the accompanying data. The number of issues of NFTs may be determined by a user who generates a digital content using an image generation system, or automatically determined by the image generation system. Finally, the virtual viewpoint image of the angle of view determined in step S111 is associated with the second surface 302. Which surface is to serve as the first, second, or third surface can be arbitrarily set in advance.

In step S113, the CPU 111 determines whether to assign an NFT to the digital content. For this purpose, for example, a GUI for inquiring of the user whether to assign the NFT to the digital content is displayed on the display unit 115. If the user selects "Assign" the NFT (YES in step S113), the processing proceeds to step S114. If "not assign" is selected (NO in step S113), the procedure is completed.

In step S114, the NFT assignment unit 204 assigns the NFT to the digital content and encrypts the digital content.

As described above, according to the present exemplary embodiment, a virtual viewpoint image determined to have a high image quality and selected based on quantitative image quality information can be displayed on a digital content using a GUI.

In the present exemplary embodiment, the image processing system 100 may be installed in a broadcasting station or the like, and create and broadcast a digital content in a three-dimensional shape as illustrated in FIG. 4, or provide the digital content via the Internet. At this time, an NFT can be assigned to the digital content. In other words, in order to improve asset value, for example, the quantity of contents to be distributed is limited and the contents are managed with serial numbers, making it possible to provide rarity. Further, an NFT is a token for issuing and distributing on a blockchain. Examples of the format of NFTs include token standards called Ethereum Request for Comments (ERC)-721 and ERC-1155.

A token is typically stored in association with a wallet managed by the user.

In the present exemplary embodiment, the angle of view to be cut out from a virtual viewpoint image is determined in steps S108 to S111 of FIG. 7, but the present disclosure is not limited thereto. For example, the virtual viewpoint image selected in step S107 may be used as a thumbnail image for the digital content as it is. In this case, the virtual viewpoint image may be compressed to reduce its file size.

A second exemplary embodiment will be described. In the first exemplary embodiment, the method of determining an image to be associated with a content display surface based on image quality information using a GUI has been described, but in the second exemplary embodiment, a method for automatic determination will be described with reference to FIGS. 1, 2, 4, 8, and 9.

Description of Configuration of Content Generation Unit 200

Figure 8:
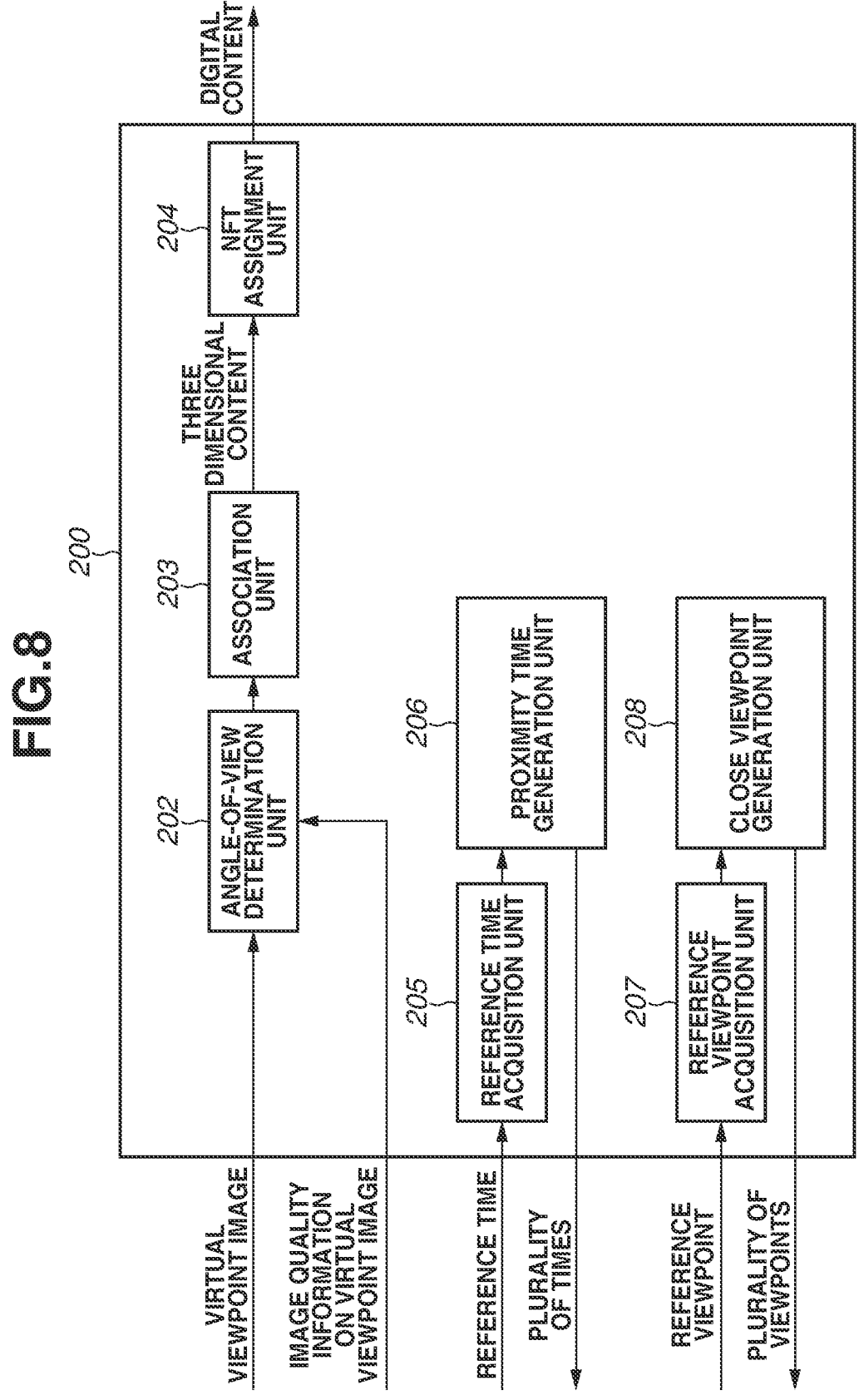
FIG. 8 illustrates a configuration example of the content generation unit according to one or more aspects of the present disclosure.

A configuration of a content generation unit 200 according to the second exemplary embodiment will be described with reference to FIG. 8. The content generation unit 200 includes a reference time acquisition unit 205, a proximity time generation unit 206, a reference viewpoint acquisition unit 207, and a close viewpoint generation unit 208, in addition to the units 202 to 204 described in the first exemplary embodiment.

An overview of each unit will now be described. Details will be described below using a flowchart of FIG. 10.

The reference time acquisition unit 205 acquires an image capturing time (reference time) of an arbitrary scene in a virtual viewpoint image from the outside.

The proximity time generation unit 206 generates a plurality of image capturing times in the proximity of the reference time acquired by the reference time acquisition unit 205.

The reference viewpoint acquisition unit 207 acquires the position of an arbitrary virtual viewpoint (reference viewpoint) in the virtual viewpoint image.

The close viewpoint generation unit 208 generates a plurality of virtual viewpoints close to the reference viewpoint acquired by the reference viewpoint acquisition unit 207.

Figure 9:
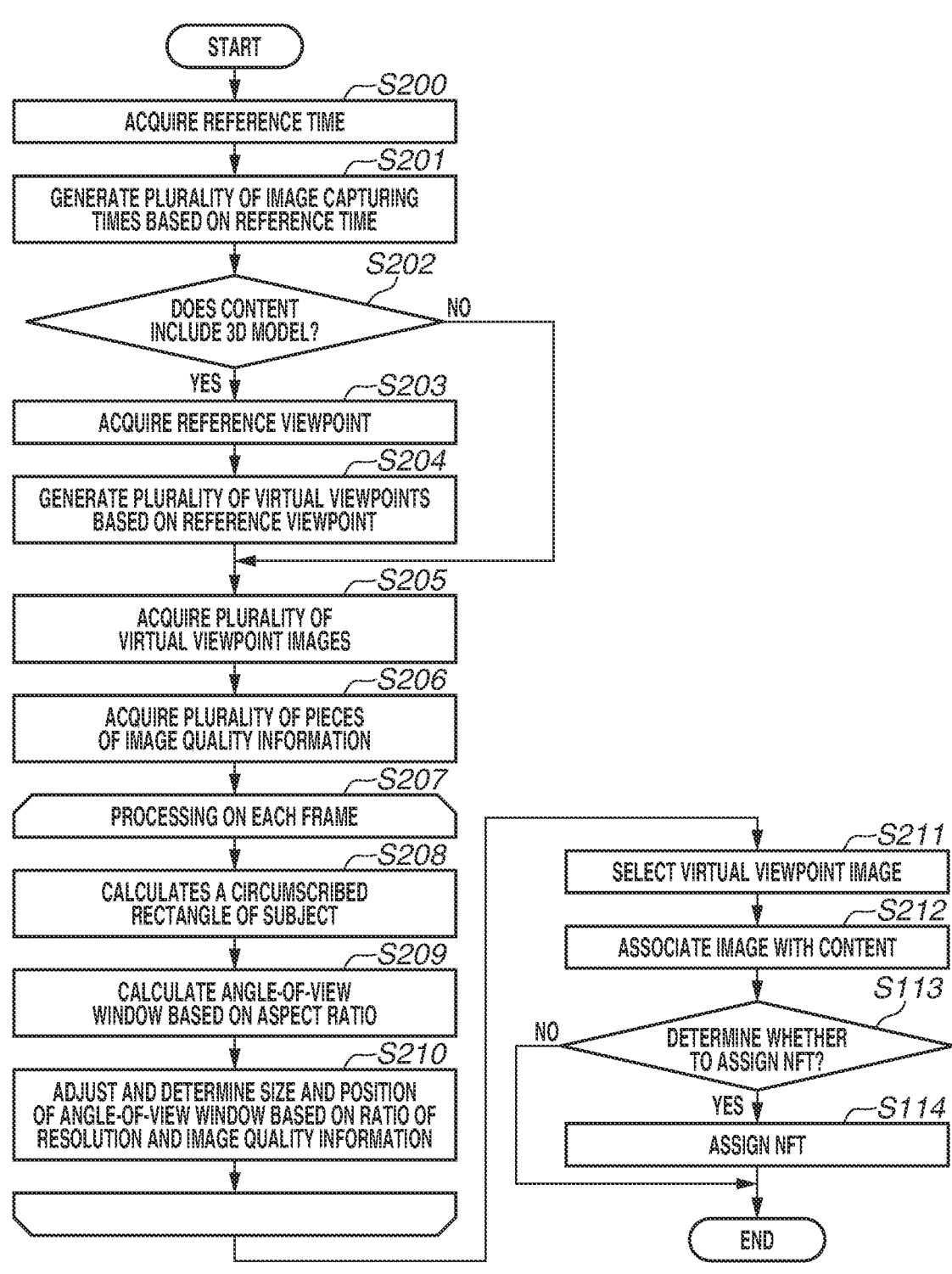
FIG. 9 is a flowchart illustrating an operation procedure for an image processing system according to one or more aspects of the present disclosure.

Automatic Determination Method for Angle of View Based on Image Quality Information FIG. 9 is a flowchart illustrating an operation procedure for an image processing system 100 and the content generation unit 200 according to the second exemplary embodiment. In FIG. 9, steps (S113 and S114) denoted by the same reference numerals as those in FIG. 7 described in the first exemplary embodiment are the same pieces of processing as those in FIG. 7, and a description thereof will be omitted.

The present exemplary embodiment will be described in detail along this flowchart.

The image processing system 100 starts processing in response to when the operation unit 116 receives an operation to start content creation from a user.

In step S200, the reference time acquisition unit 205 acquires an image capturing time (reference time) of a main scene in a virtual viewpoint image. In the present exemplary embodiment, the image capturing time of a main camera image associated with the first surface 301 in FIG. 4 is acquired.

In step S201, the proximity time generation unit 206 generates a plurality of image capturing times in the proximity of the reference time obtained by the reference time acquisition unit 205. Proximity image capturing times are image capturing times before and after a reference time as their center. The interval between these image capturing times is one frame to several frames.

The number of frames as this interval may be a value fixed with the image processing system 100 or may vary with the amount of movement of a main subject. For example, the movement vector of a main subject is detected, and the interval is shortened in accordance with the speed, such as one frame in the case of running, and three frames in the case of walking.

In step S202, if the present digital content includes a 3D model for the subject (YES in step S202), the processing proceeds to step S203, and if it is a two-dimensional video with one or more camera paths (NO in step S202), the processing proceeds to step S205.

In step S203, the reference viewpoint acquisition unit 207 acquires the position of an arbitrary virtual viewpoint (reference viewpoint) in the virtual viewpoint image. In the present exemplary embodiment, the installation position of the camera that has captured the main camera image associated with the first surface 301 in FIG. 4 and camera parameters (the orientation and the focal length of the camera) at the image capturing time are acquired. The orientation of the camera can be acquired by, for example, recording the orientation of the camera on the panhead on which the camera is set in synchronization with the image capturing time. The focal length can be acquired, for example, by recording internal parameters of the camera in synchronization with the image capturing time.

In step S204, the close viewpoint generation unit 208 generates a plurality of virtual viewpoints close to the reference viewpoint obtained by the reference viewpoint acquisition unit 207. Close virtual viewpoints are virtual viewpoints arranged at a plurality of positions on the spherical surface defined by the radius equal to the distance between the position of a main subject as their center and a reference viewpoint. The direction of each virtual viewpoint is a direction toward the position of the subject.

In step S205, if the digital content includes a 3D model for the subject, the CPU 111 acquires a plurality of virtual viewpoint images corresponding to the virtual viewpoints and the image capturing times generated in steps S201 and S204 from the image generation unit 3 and stores the virtual viewpoint images in the storage unit 5. If a two-dimensional video is included, the CPU 111 acquires a plurality of virtual viewpoint images corresponding to the image capturing times generated in step S201 and a predetermined camera path set in advance from the image generation unit 3 and stores the virtual viewpoint images in the storage unit 5. In this way, the acquisition of a plurality of virtual viewpoint images at image capturing times and viewpoints in the proximity of a scene, as a reference, serving as a main scene in a virtual viewpoint image makes it possible to acquire images serving as candidates for selection based on image quality information.

In step S206, the image quality analysis unit 4 acquires information at the time of 3D model generation corresponding to the plurality of virtual viewpoint images from the image generation unit 3, generates image quality information on each virtual viewpoint image, and stores the image quality information in the storage unit 5.

In step S207, the angle-of-view determination unit 202 performs subsequent steps S208 to S210 on each frame of the virtual viewpoint images of a plurality of frames stored in the storage unit 5.

In step S208, the angle-of-view determination unit 202 calculates a circumscribed rectangle surrounding the main subject.

In step S209, the angle-of-view determination unit 202 calculates an angle-of-view window by adjusting the lengths of the sides of the circumscribed rectangle to be equal to the aspect ratio of a three-dimensional shape content without changing the center coordinates as the intersection of the diagonal lines of the circumscribed rectangle.

In step S210, the angle-of-view determination unit 202 adjusts and determines the size and the position of the angle-of-view window so that the image quality information is optimized based on the image quality information and the ratio of resolutions (the ratio of resolutions between the angle-of-view window and the content display surface).

In step S211, the angle-of-view determination unit 202 compares the pieces of image quality information on the images in the angle-of-view windows determined in the respective frames, and determines the image in the angle-of-view window with the best image quality information.

In step S212, the association unit 203 performs resolution conversion on the image of the angle of view determined in step S211 so that the resolution of the image matches the resolution of the display surface of the three-dimensional digital content, and associates the image with the display surface of the digital content.

As described above, according to the present exemplary embodiment, a virtual viewpoint image determined to have a high image quality and selected based on quantitative image quality information can be displayed on a digital content.

A third exemplary embodiment will be described. In the first and second exemplary embodiments, the image selection and the angle-of-view determination method for a still image to be associated with a display surface of a digital content has been described. In the third exemplary embodiment, a method for a moving image to be associated will be described with reference to FIGS. 1, 2, 10, and 11.
Description of Configuration of Content Generation Unit 200

Figure 10:
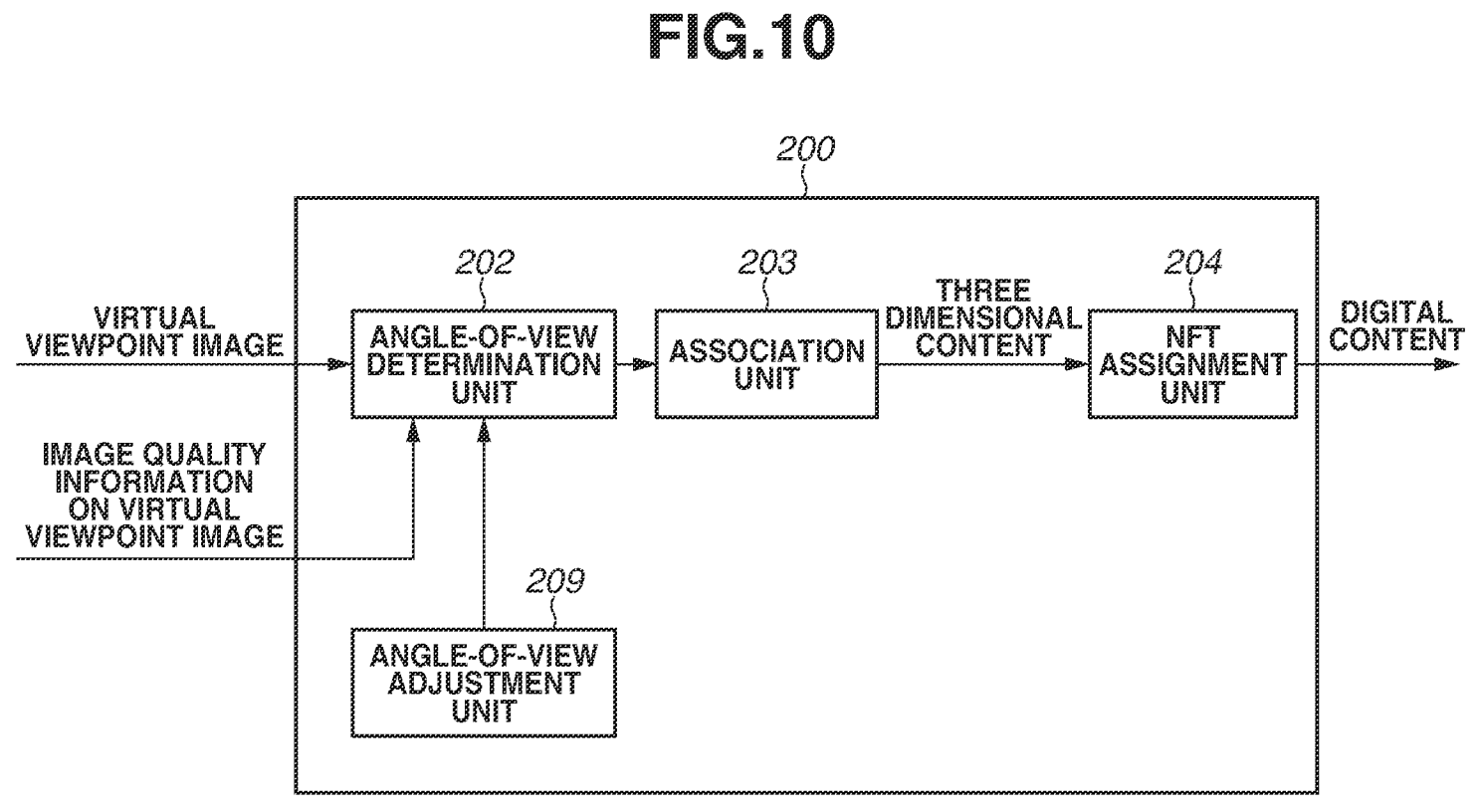

A configuration of a content generation unit 200 according to the third exemplary embodiment will be described with reference to FIG. 10. The content generation unit 200 includes an angle-of-view adjustment unit 209, in addition to the units 202 to 204 described in the first exemplary embodiment.

Figure 11:
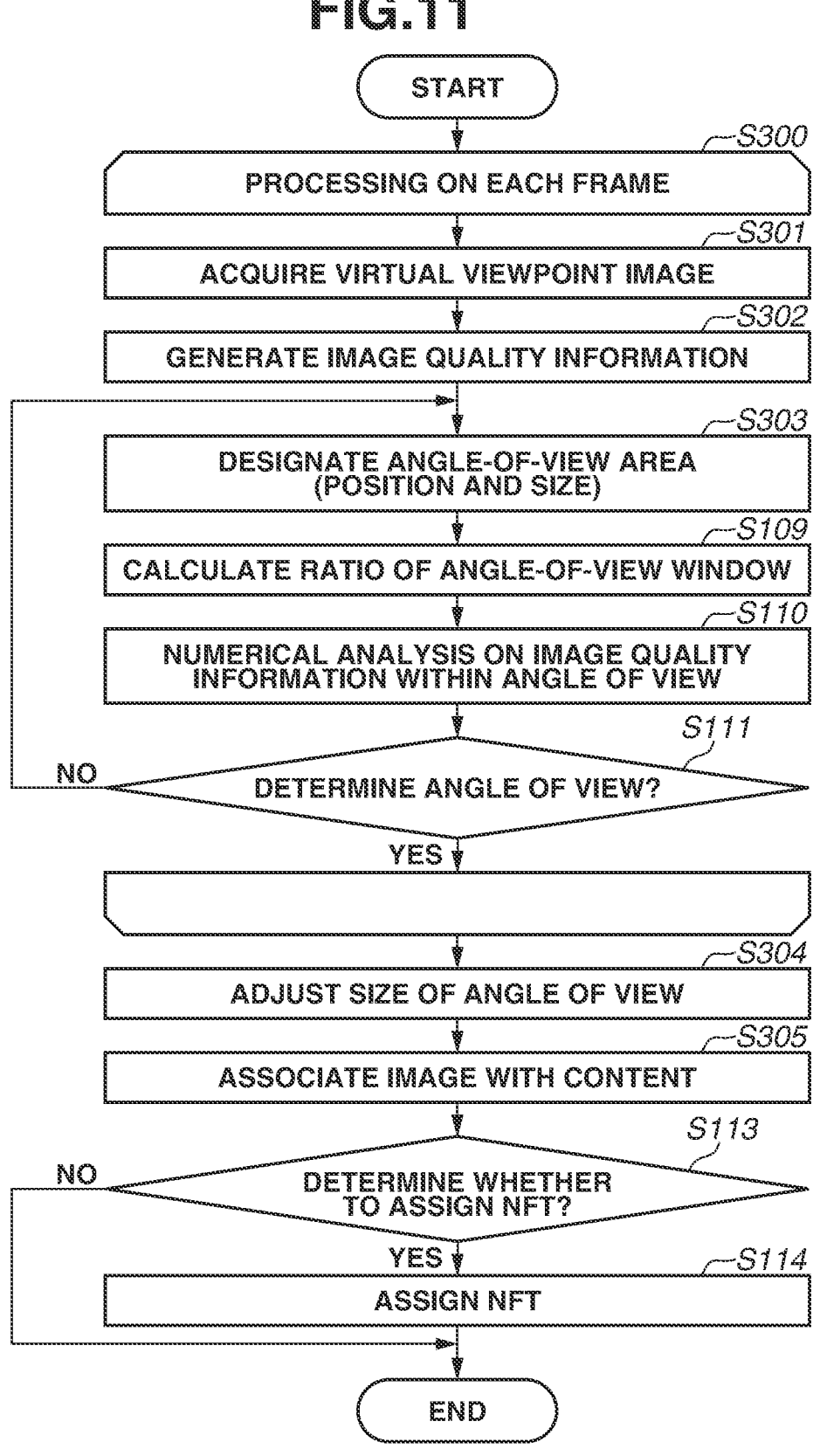
FIG. 11 is a flowchart illustrating an operation procedure for an image processing system according to one or more aspects of the present disclosure.

With a moving image as a virtual viewpoint image included in a digital content, the angle-of-view adjustment unit 209 adjusts resolutions of angles of view in respective frames constituting the moving image determined by the angle-of-view determination unit 202.
Method of Adjusting Angle of View in Moving Image as Virtual Viewpoint Image Included in Digital Content FIG. 11 is a flowchart illustrating an operation procedure for the image processing system 100 and the content generation unit 200 according to the third exemplary embodiment. In FIG. 11, steps (S109 to S111, S113, and S114) denoted by the same reference numerals as those in FIG. 7 described in the first exemplary embodiment are the same pieces of processing as those in FIG. 7, and a description thereof will be omitted. The present exemplary embodiment will be described in detail along this flowchart.

The image processing system 100 starts processing in response to when the operation unit 116 receives an operation to start content creation from a user.

In step S300, the angle-of-view determination unit 202 performs the following steps S301, S302, and S108 to S111 on each frame of a two-dimensional virtual viewpoint video associated with the digital content.

In step S301, the angle-of-view determination unit 202 acquires one frame of a virtual viewpoint image.

In step S302, the image quality analysis unit 4 acquires information at the time of generation of the virtual viewpoint image from the image generation unit 3 and generates image quality information on the virtual viewpoint image. The angle-of-view determination unit 202 acquires the image quality information.

In step S303, the CPU 111 designates, to the angle-of-view determination unit 202, the position and the size of an angle of view equal to the aspect ratio of a display surface included in the three-dimensional digital content, in the acquired virtual viewpoint image. For this purpose, for example, a GUI for inquiring of the user about the position and size of the angle of view is displayed on the display unit 115. The difference from the first exemplary embodiment is that the center position of the angle of view of the current frame is determined so that the center position moves smoothly in consideration of the center position of the angle of view of the previous frame. For this purpose, for example, the center coordinates of the angle of view of the previous frame are displayed with a GUI. Only the previous frame may be used, or the center coordinates of a plurality of previous frames may be displayed together in order to learn the trajectory of the center coordinates.

In step S304, the angle-of-view determination unit 202 adjusts the sizes of the angles of view of all the frames. This is because, with variation in the size of the angle of view in each frame, the video becomes shaky when viewed as a moving image due to resolution conversion in associating each image with the content display surface.

In the present exemplary embodiment, the sizes of all the angles of view are narrowed in accordance with the size of the smallest angle of view. This is because, if the sizes of all the angles of view are adjusted in the direction of widening, an angle of view including an image with a low image quality is generated. With high image qualities as a whole, the adjustment may be performed in accordance with the size of an arbitrary angle of view. The adjustment method is not limited to this, and an adjustment method may be used of gradually changing the size of the angle of view in each frame so as not to cause a video to become shaky when viewed as a moving image. For example, a method may be used of removing large variations by applying a smoothing filter to the size of the angle of view in each frame arranged in time series.

In step S305, the images with the angles of view determined in step S304 are subjected to resolution conversion so that the resolutions of the images match the resolution of the display surface of the three-dimensional digital content, and the images are associated with the display surface of the digital content.

As described above, according to the present exemplary embodiment, even with a moving image as a virtual viewpoint image included in a digital content, a virtual viewpoint image determined to have a high image quality and selected based on quantitative image quality information can be displayed on a digital content.

A fourth exemplary embodiment will be described. In the first exemplary embodiment, an image to be associated with a content display surface is determined based on a user operation with reference to image quality information, and in the second exemplary embodiment, the image is automatically determined by the computer. In the fourth exemplary embodiment, a computer selects candidates of an image to be associated with a content display surface, and determines an image to be associated with the content display surface from the candidates based on a user operation.

Figure 12:
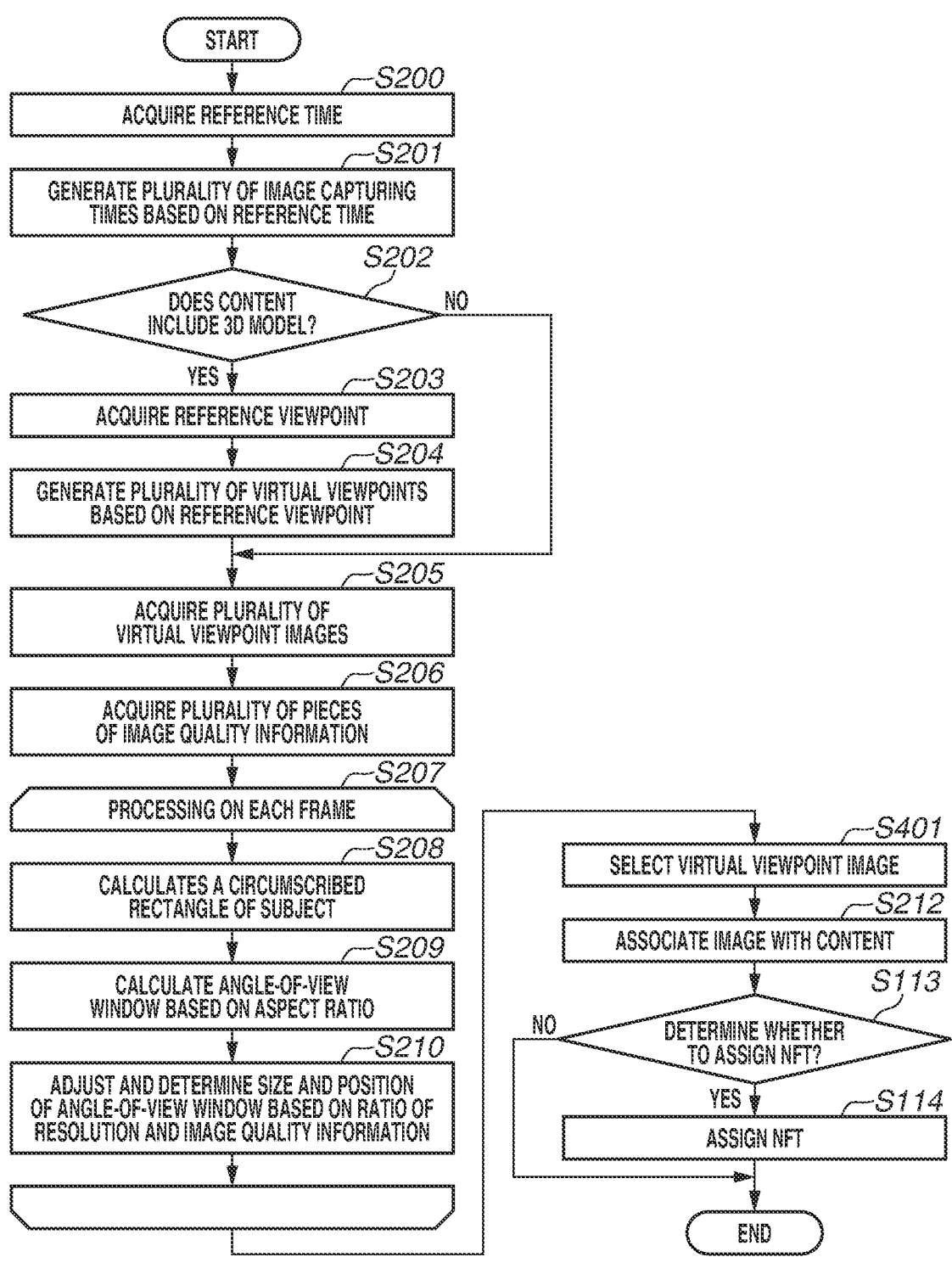
FIG. 12 is a flowchart illustrating an operation procedure for an image processing system according to one or more aspects of the present disclosure.

FIG. 12 is a flowchart illustrating an operation procedure for the image processing system 100 according to the fourth exemplary embodiment. Steps S200 to S210, S212, S113, and S114 are the same processing as those in FIGS. 7 and 9, and a description thereof will be omitted.

In step S401, the angle-of-view determination unit 202 determines an image to be associated with a content display surface based on a user operation. Through the processing in steps S200 to S210, a plurality of virtual viewpoint images is extracted (generated) which correspond to virtual viewpoints at image capturing times in the proximity of a reference time, the virtual viewpoints being generated based on a reference viewpoint. These images are controlled to be displayed on the display unit 115, and the user, who sees the display, determines an image to be associated with the content display surface. In the display according to the present exemplary embodiment, the GUI illustrated in FIG. 6 is set for each of the plurality of virtual viewpoint images extracted through the processing of steps S200 to S210, but the present disclosure is not limited thereto. A plurality of extracted virtual viewpoint images may be displayed in a list.

Through the above processing, the computer can select candidates for an image to be associated with a content display surface, and determine an image to be associated with the content display surface from the candidates based on a user operation. Consequently, a user can select an image to be associated with a content display surface from among a plurality of virtual viewpoint images with high image qualities selected by a computer from a virtual viewpoint video, making it possible to facilitate determination of a virtual viewpoint image with a high image quality.

While the present disclosure has been described in detail based on the plurality of exemplary embodiments, the present disclosure is not limited to the above-described exemplary embodiments. Various modifications can be made based on the gist of the present disclosure, and these modifications are not excluded from the scope of the present disclosure.

According to the present disclosure, a virtual viewpoint image with a high image quality can be generated from a virtual viewpoint video based on information on an image quality of the virtual viewpoint image.

A computer program for realizing a part or all of the functions of the above-described exemplary embodiments may be supplied to an image processing system or the like via a network or various types of storage media. A computer (or a CPU, a micro processing unit (MPU), or the like) in the image processing system or the like may read and execute the program. In this case, the program and a storage medium storing the program is included in the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-041650, filed Mar. 16, 2023, which is hereby incorporated by reference herein in its entirety.

18

What is claimed is:

1. An image processing system comprising:
one or more memories storing instructions; and
one or more processors executing the instructions to:
acquire a plurality of virtual viewpoint images generated based on a plurality of captured images obtained by a plurality of image capturing apparatuses performing image capture;
determine a specific virtual viewpoint image of the plurality of virtual viewpoint images based on a first user operation;
display image quality information indicating an image quality of a partial region specified based on a second user operation, the image quality information is generated by quantifying information in generating a virtual viewpoint image, the partial region being in the specific virtual viewpoint image and
generate a partial image by cutting out the specified partial image from the specific virtual viewpoint image,
wherein the partial image is a thumbnail image indicating an overview of a virtual viewpoint video generated based on the plurality of virtual viewpoint images.

2. The image processing system according to claim 1, wherein the one or more processors executing further instructions to display the specific virtual viewpoint image.

3. An image processing method comprising:
acquiring a plurality of virtual viewpoint images generated based on a plurality of captured images obtained by a plurality of image capturing apparatuses performing image capture;
determining a specific virtual viewpoint image of the plurality of virtual viewpoint images based on a first user operation;
displaying image quality information indicating an image quality of a partial region specified based on a second user operation, the image quality information is generated by quantifying information in generating a virtual viewpoint image, the partial region being in the specific virtual viewpoint image; and
generating a partial image by cutting out the specified partial image from the specific virtual viewpoint image,
wherein the partial image is a thumbnail image indicating an overview of a virtual viewpoint video generated based on the plurality of virtual viewpoint images.

4. A non-transitory computer readable storage medium storing a computer program for causing a computer to execute an image processing method, the method comprising:
acquiring a plurality of virtual viewpoint images generated based on a plurality of captured images obtained by a plurality of image capturing apparatuses performing image capture;
determining a specific virtual viewpoint image of the plurality of virtual viewpoint images based on a first user operation, the image quality information is generated by quantifying information in generating a virtual viewpoint image; and
displaying image quality information indicating an image quality of a partial region specified based on a second user operation, the partial region being in the specific virtual viewpoint image; and
generating a partial image by cutting out the specified partial image from the specific virtual viewpoint image,
wherein the partial image is a thumbnail image indicating an overview of a virtual viewpoint video generated based on the plurality of virtual viewpoint images.

* * * * *